United States Patent [19]

Cottrell et al.

[11] 4,169,418

[45] Oct. 2, 1979

[54] METHOD AND A SYSTEM FOR INCINERATING COMBUSTIBLE WASTES

[75] Inventors: Henry L. Cottrell, Selma; Wesley A. Faith, Fresno, both of Calif.

[73] Assignee: VFE Corp., Fowler, Calif.

[21] Appl. No.: 809,094

[22] Filed: Jun. 23, 1977

[51] Int. Cl.² .................... F23G 5/00; F23J 15/00
[52] U.S. Cl. ........................... 110/346; 110/216; 110/244
[58] Field of Search ............ 110/216, 222, 244, 346, 110/119, 247

[56] References Cited

U.S. PATENT DOCUMENTS

| | | | |
|---|---|---|---|
| 2,702,013 | 2/1955 | Atteberry | 110/247 |
| 3,658,017 | 4/1972 | Dibelius et al. | 110/119 |
| 3,788,244 | 1/1974 | Polsak et al. | 110/119 |
| 3,889,608 | 6/1975 | Pitt | 110/244 |
| 3,892,190 | 7/1975 | Sharpe | 110/119 |
| 3,939,781 | 2/1976 | Adams | 110/119 |
| 4,050,390 | 9/1977 | Hara et al. | 110/119 |

*Primary Examiner*—Kenneth W. Sprague
*Attorney, Agent, or Firm*—Huebner & Worrel

[57] ABSTRACT

A system including conduit connected to a source of solid waste, a shredder for particlizing solid waste, an igniter for igniting particlized waste, a gas burner for initially heating the liner of the igniter to a temperature above ignition temperatures for the waste, and an air duct for transporting burning particles of waste along a vortexing path extending downwardly through the igniter, then through an agitating conduit, within which the burning particles are maintained in suspension and are finally introduced upwardly into a particle trap within which combustion of ignited particles is completed. A by-products recovery system is connected with the trap for collecting ash, for subsequent usage, and for recovering heat to be returned to the gin.

6 Claims, 22 Drawing Figures

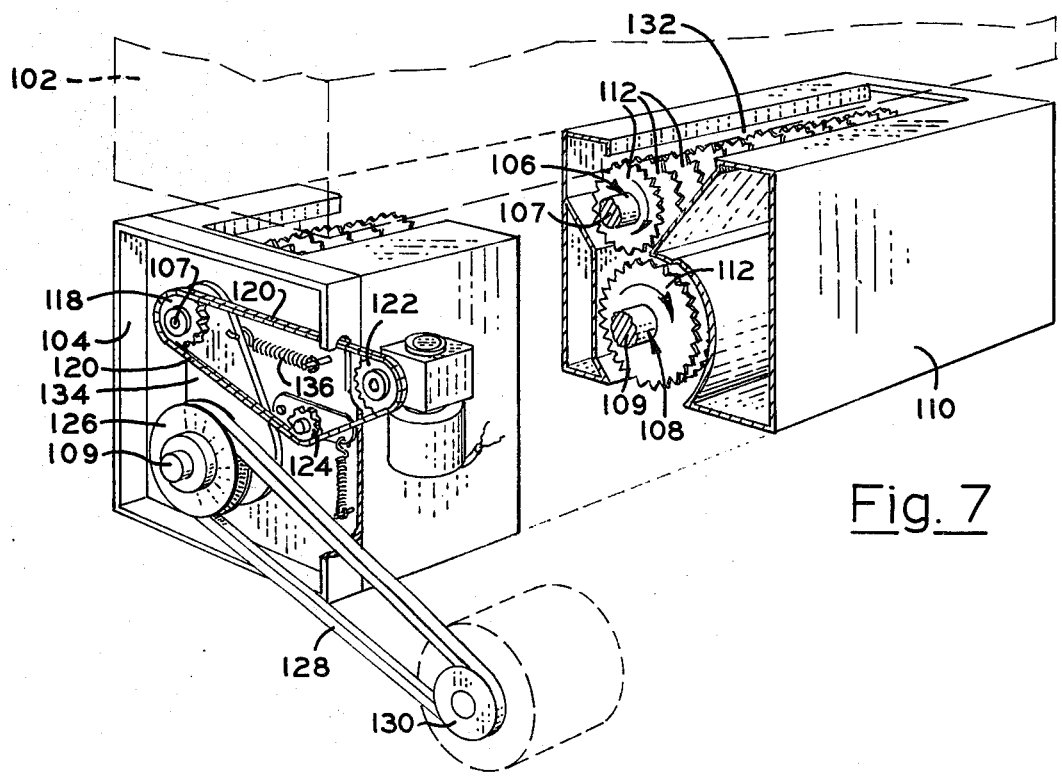
Fig. 7
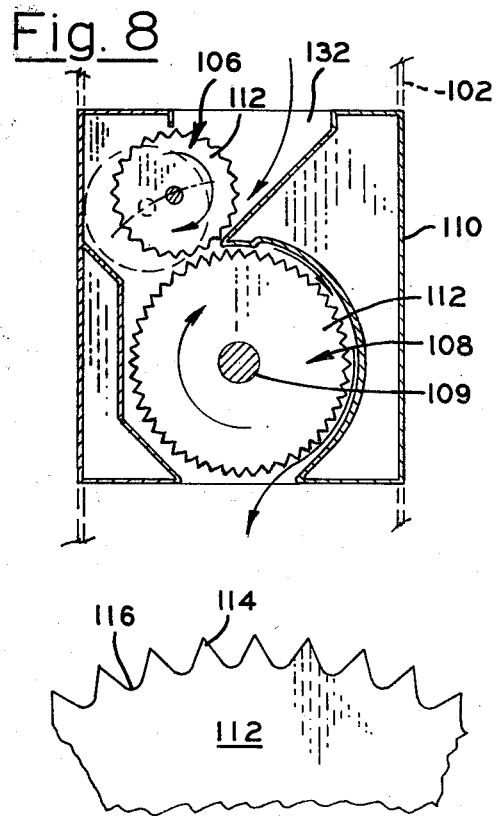
Fig. 8
Fig. 10
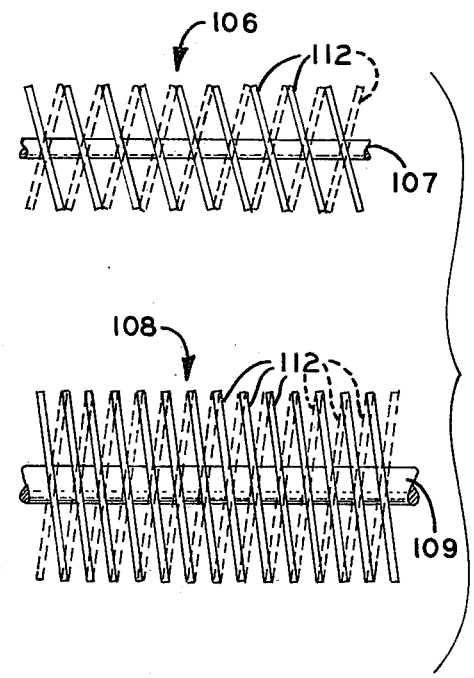
Fig. 9

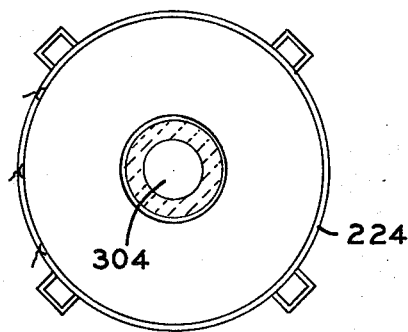
Fig. 14
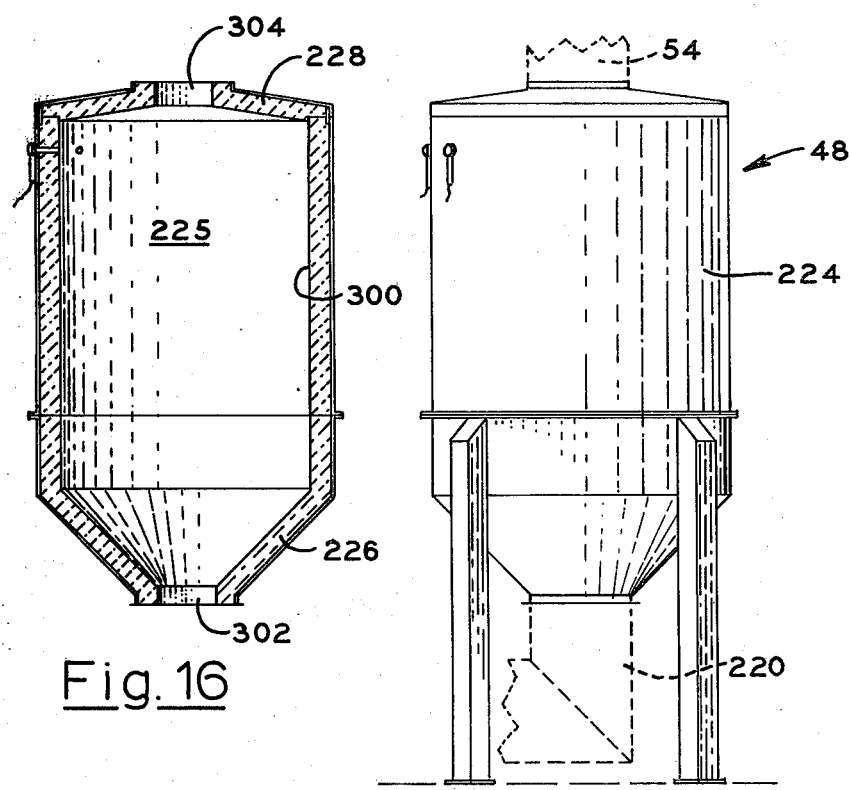
Fig. 15
Fig. 16
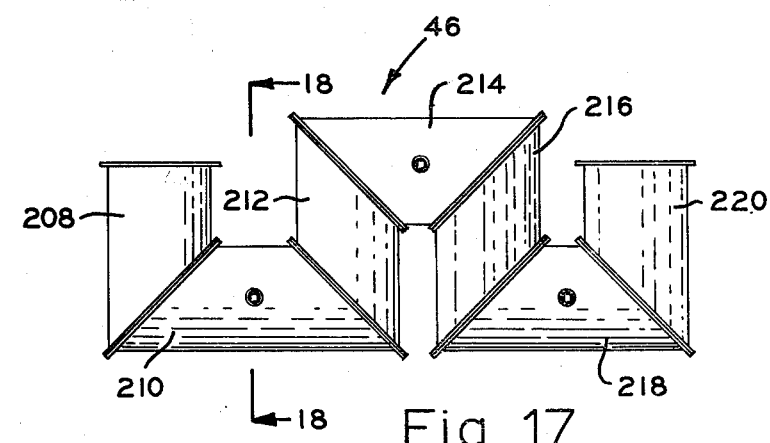
Fig. 17
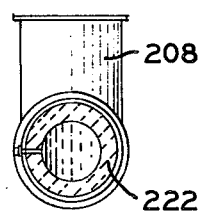
Fig. 18

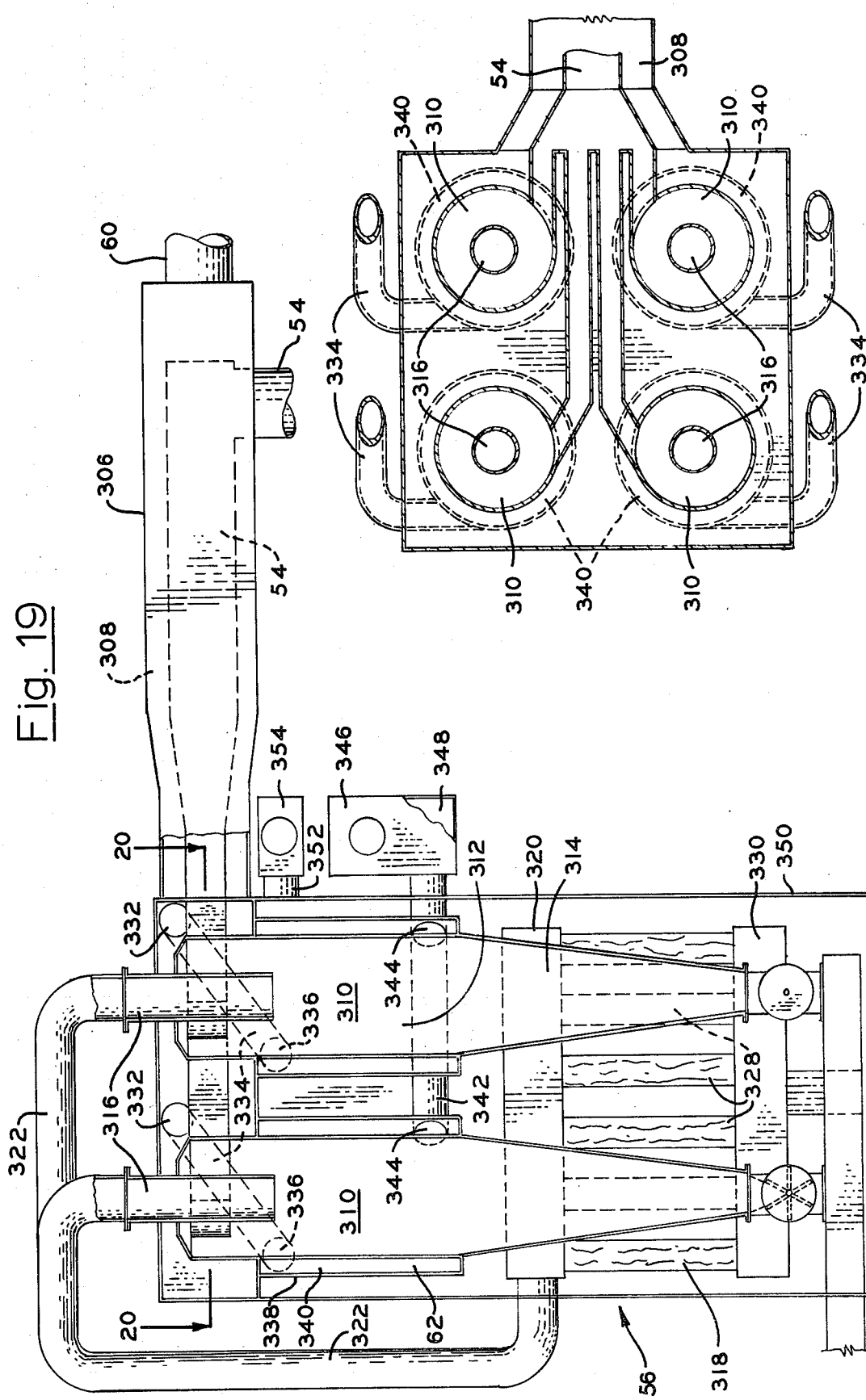

METHOD AND A SYSTEM FOR INCINERATING COMBUSTIBLE WASTES

BACKGROUND OF THE INVENTION

1. Field of the Invention

The invention generally relates to a method and system for incinerating combustible solid wastes, and more particularly to a method and system for incinerating gin trash.

2. Description of the Prior Art

As is well known, practically every segment of industry and agriculture is searching for alternate sources of energy as well as techniques for disposing of waste. For example, cotton gins in California and Arizona annually face the problem of disposing of gin trash in amounts estimated at approximately 350 million pounds per year, or approximately 140 pounds of trash for each bale of cotton ginned.

Currently, three known methods are available for disposing of gin trash; namely, burning the trash, feeding the trash to animals, or returning the trash to the soil, in either its raw or composted form.

Unfortunately, certain states, by law, treat gin trash as industrial waste and prohibit disposal by open burning. Moreover, potentially hazardous chemicals often are found in gin trash and preclude the trash from being fed to livestock, or disposed through a spreading on or introduction of the trash into the soil. In any event, disposal of trash not only is considered to be costly, but frequently is difficult if not impossible where the chemical content thereof can or does impair the well-being of animal and/or plant life.

In view of the recognized need to develop alternate sources of energy as well as the existence of a need to conserve available fossil fuels, much attention has been directed to using gin trash as a source of the energy required in the process-drying of seed cotton. While estimates of pounds per bale of cotton ginned throughout the United States may vary over a relatively wide range, there exists a consensus to the effect that the potential for recovery of heat resulting from incineration of gin waste is sufficient to render uses of fossil fuel sources in the process-drying of seed cotton obsolete.

Unfortunately, incineration of gin trash has not met with general acceptance, either for purposes of disposing of waste, or serving as an alternate source of energy. This results, at least in part, from the fact that gin waste is difficult to burn even when utilizing the better known of systems such as the so-called tepee burner. This difficulty is emphasized where existing standards of pollution control must be met, since in many instances clean-air legislation prevents continued use of the tepee burner.

In attempting to upgrade incinerators, in an effort to meet clean-air standards, various closed systems have been suggested. However, designers of the systems heretofore proposed have been plagued by enormous problems resulting from the formation of "clinkers", or rock-like deposits, as a by-product. Often such deposits precipitate clogging with catastrophic results.

Therefore, as can be appreciated, there currently exists a need for a practical method and system capable of incinerating gin trash with efficiency at the level required to meet clean-air legislative standards and to provide practical quantities of energy economically.

It is therefore the general purpose of the instant invention to provide a method and system for incinerating combustible wastes, particularly gin trash, whereby the trash can be disposed of economically and efficiently with an attendant recovery of substantial quantities of energy, such as heat and the like.

OBJECTS AND SUMMARY OF THE INVENTION

It is therefore an object of the instant invention to provide a method and system for burning combustible wastes.

It is another object to provide a method for incinerating combustible wastes, such as gin trash, without violating standards imposed on the industry through passage of clean-air legislation.

Another object is to provide in a system for incinerating combustible wastes, such as gin trash and the like, an improved shredder for particlizing the trash.

It is another object to provide in a system for incinerating combustible wastes, such as gin trash and the like, an improved igniter for igniting the waste.

Another object is to provide an improved shredder particularly suited for particlizing solid wastes, such as gin trash and the like, preparatory to subjecting the resulting particles to auto ignition temperature.

Another object is to provide an improved igniter particularly suited for use in heating combustible wastes such as particlized gin trash and the like to auto ignition temperature.

Another object is to provide an agitating conduit for tumbling burning particles of waste suspended in a flowing stream of combustion supporting air whereby combustion is enhanced.

Another object is to provide an improved method and system for burning combustible wastes, without excessive formation of clinkers.

Another object is to provide in a system for incinerating solid wastes, such as gin trash and the like, a combustion chamber comprising a particle trap for confining a mass of burning particles of waste until the particles are substantially consumed.

Another object is to provide in a system for incinerating combustible wastes such as gin trash and the like an improved ash recovery system for recovering ash and heat from streams of by-products of combustion.

Another object is to provide a method and a system particularly suited for use in connection with the incineration of gin trash and the like, although not necessarily restricted in use thereto, since the method and the system which embodies the invention may be similarly useful when employed in incinerating combustible wastes of a general nature.

These and other objects and advantages are achieved through a method and a system in which solid waste, such as gin trash, is recovered, shredded to a particlized form, ignited, transferred while in a burning state, and confined during completion of burning, while the by-products of combustion including heat and ash are recovered for subsequent usage.

BRIEF DESCRIPTION OF THE DRAWINGS

FIG. 7 is a partially sectioned perspective view of a shredder included in the subsystem shown in FIG. 5.

FIG. 8 is a cross-sectional view of the shredder subsystem shown in FIG. 7 depicting alternate positions for a shredding roller included therein.

FIG. 9 is an exploded schematic view illustrating operational characteristics for saw blades of the rollers shown in FIGS. 7 and 8.

FIG. 10 is a fragmented view of one of the saw blades shown in FIGS. 7, 8 and 9.

FIG. 14 is a top-plan view of a main burner included in the system shown in FIGS. 1 and 3.

FIG. 15 is a side elevation of the main burner shown in FIG. 14.

FIG. 16 is a sectioned side elevational view of the main burner shown in FIGS. 14 and 15.

FIG. 17 is a side elevational view of an agitating conduit provided for tumbling burning particles of waste as the particles are transported from the igniter shown in FIGS. 11 and 12 to the main burner shown in FIGS. 14 through 16.

FIG. 18 is cross-sectional view taken generally along lines 18—18 of FIG. 17.

FIG. 19 is a side elevational view of the filter subsystem shown in FIGS. 1 and 13.

FIG. 20 is a partially sectioned plan view taken generally along lines 20—20 of FIG. 19.

DESCRIPTION OF THE PREFERRED EMBODIMENT

General Description

Figure 1:
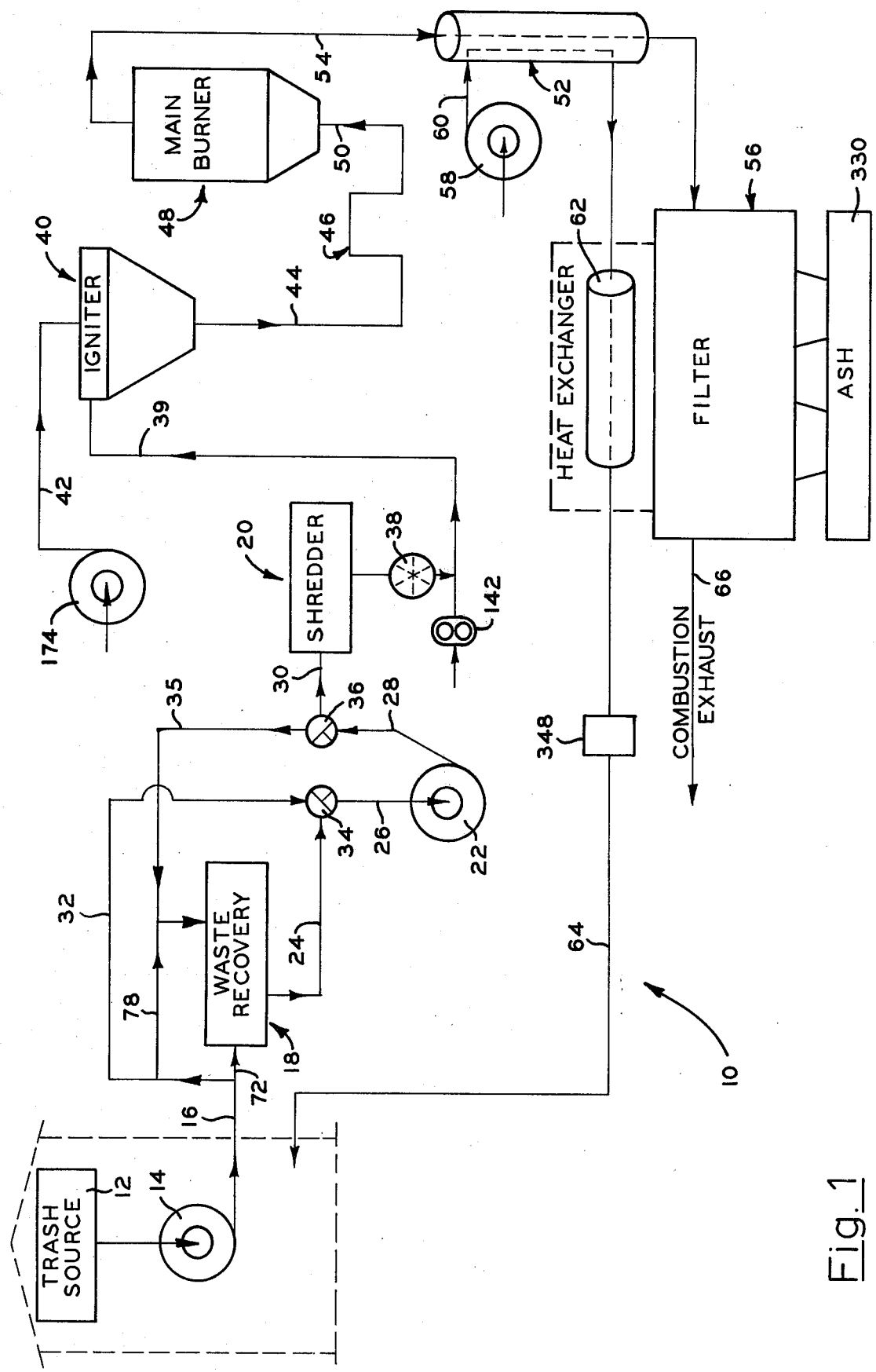
FIG. 1 is a diagrammatic view depicting the flow of gin trash as it moves through the system which embodies the principles of the instant invention.

Turning now to the drawings wherein like reference characters designate like or corresponding parts throughout the several views, there is shown in FIG. 1 a system, generally designated 10, for incinerating combustible wastes such as gin trash and the like derived from a source 12, such as a cotton gin. As illustrated, the gin trash is blown by an impeller 14 along a conduit 16 to a waste recovery subsystem 18. From the waste recovery subsystem, the gin trash is delivered to a shredder subsystem 20, via an impeller 22 and conduits 24, 26, 28 and 30.

As a practical matter, a by-pass conduit 32 is connected in communication with the conduit 16 and the conduit 26 whereby gin trash may be caused to by-pass the waste recovery subsystem 18 for direct introduction into the impeller 22. Interposed in the conduit 26, between the impeller 22, the waste recovery subsystem 18 and the conduit 32, there is a two-way valve 34. This serves to interconnect the conduits 24, 26 and 32 in a manner such that gin trash may be selectively delivered to the impeller 22, through the conduit 32, or, alternatively, through the waste recovery subsystem 18.

A similar by-pass system, not designated, is provided for re-delivering gin trash from the impeller 22 back to the waste recovery subsystem 18, where so desired. This by-pass system serves to connect the conduit 28 with a return conduit 35 at another two-way valve 36. This valve serves to interconnect the conduits 28, 30 and 35 in a manner such that gin trash exiting the impeller 22 is selectively directed either through the conduit 35, for return to the subsystem 18, or through the conduit 30 for introduction into the shredder 20.

From the shredder 20, the particlized gin trash is introduced through a gated air lock 38 into a pressurized conduit 39. Through this conduit the trash is introduced into an igniter subsystem, generally designated 40.

Also connected to the igniter 40 is a duct 42 which serves to introduce into the igniter 40 combustion supporting air. From the igniter 40, burning particles of gin trash are conveyed, via a conduit 44 having included therein an agitator, generally designated 46. The agitator 46 serves to tumble and thus maintain burning particles of gin trash in suspension within a flowing stream of combustion supporting air. Thus the ignited particles are conveyed to a main burner, generally designated 48 having an entry conduit 50 disposed in vertical alignment with the main burner.

From the main burner 48, by-products of combustion including heated gases and ash are delivered to a heat exchanger 52, via conduit 54, and thence to a filter subsystem, generally designated 56. The heat exchanger 52 derives atmospheric air from a blower 58, through a conduit 60, which ultimately is delivered to a heat exchanger 62 within the filter subsystem 56. From the filter subsystem 56, the heated air is returned to the gin, or similar source of gin trash via a conduit 64 while ash is collected within the filter subsystem 56. Combustion exhaust finally is discharged to atmosphere from the filter subsystem 56 via a conduit 66.

It should, in view of the foregoing, be apparent that solid combustible waste, such a gin trash and the like, is taken from a source, such as a gin, shredded to particlize the waste, fed to an igniter for purposes of ignition, and thereafter transferred to a main burner within which the process of burning is completed. From the main burner, by-products of combustion, including heated gases and ash, are expelled through a heat exchange system within which heat is recovered from the exhaust gases. Subsequent to an extraction of heat from the exhaust gases, the ash is extracted and the gases are delivered to atmosphere. Heat thus extracted is, as desired, returned to the gin while the ash is collected as an ultra-fine powder for subsequent usage in processes which form no part of the instant invention.

Waste Recovery Subsystem

Figure 2:
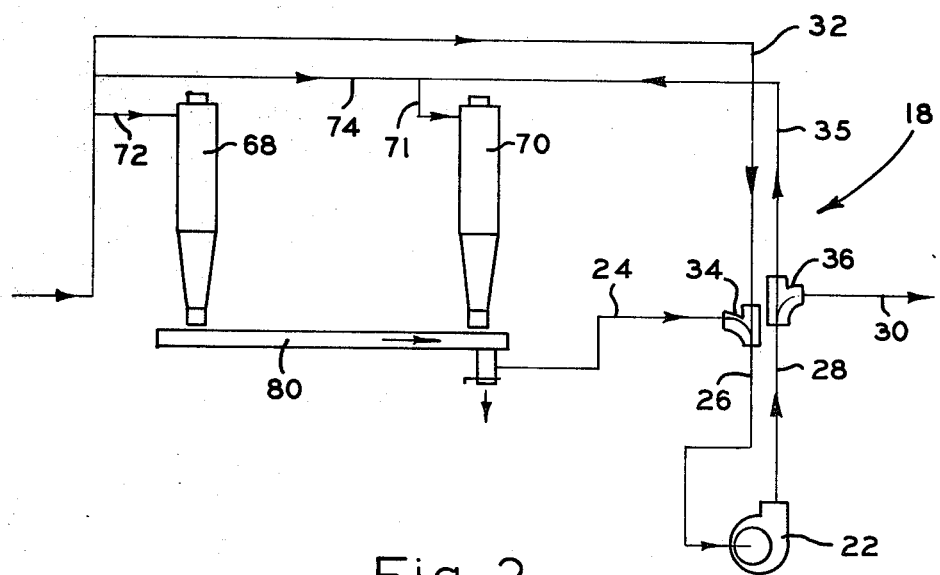
FIG. 2 is a diagrammatic view of a waste recovery subsystem included within the system shown in FIG. 1.
Figure 6:
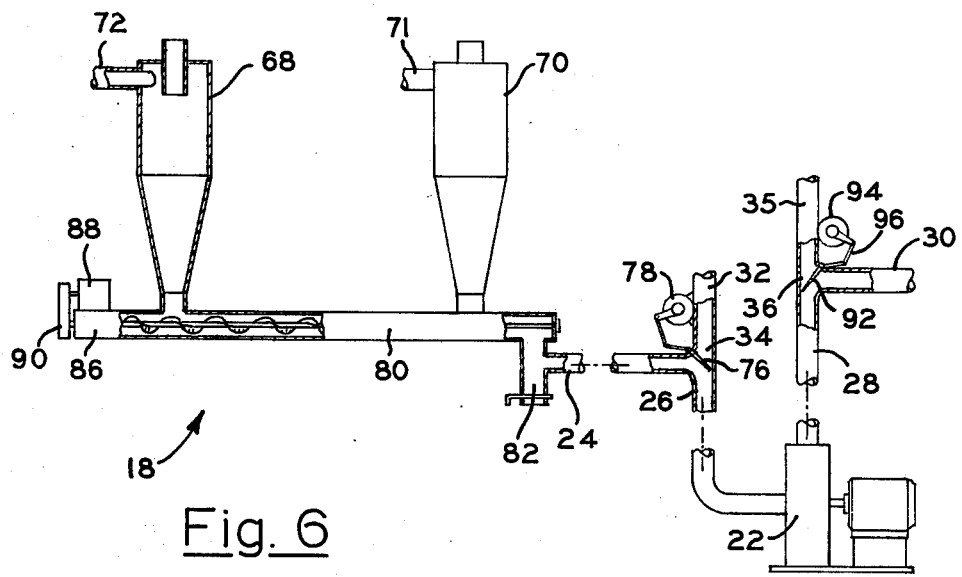
FIG. 6 is a fragmented side elevation view of the subsystem shown in FIG. 2.

Turning now to FIGS. 2 and 6, wherein is illustrated with more particularity the waste recovery subsystem generally designated 18, it can be seen that the waste recovery subsystem 18 includes a pair of cyclone separators 68 and 70. The cyclone separator 68 is connected with the conduit 16 via an entry conduit 72, while the cyclone separator 70 is connected to the conduit 16 via an entry conduit 74.

The two-way valve 34 is of any suitable design. However, as shown, this valve comprises a flapper valve having a pivotal plate 76 supported for pivotal displacement between alternate positions. Thus the conduit 26 is connected with either the conduit 24 or 32, while communication between the other of these two conduits is simultaneously interrupted. Since two-way valves are of well known construction, a detailed description of the valve 34 is omitted in the interest of brevity. However, it is to be understood that the valve is driven by an electrically energizable motor 78, acting through a suitable linkage, not designated, connected to the plate 76. As should now be apparent, pivotal displacement is imparted to the plate 76 in response to selective energization of the motor 78 for alterating the valve's mode of operation.

The end of the conduit 24, opposite the end thereof connected to the valve 34, is connected with a screw conveyor 80 through a discharge valve 82. The screw conveyor 80 serves as a feeder and includes a screw 84 extending axially through a conduit 86. This conduit is, in turn, connected to communicate with the lowermost or discharge ends of the cyclone separators 68 and 70. Hence, the waste which gravitates toward the lowermost ends of these separators is introduced into the screw conveyor 80, to be ultimately discharged to the discharge valve 82 and thence to the conduit 24. As a practical matter, the discharge valve 82 also, when desired, comprises a bifurcated valve and accommodates a discharge of waste through an opening, not designated. The screw 84 is supported by suitable bearings and is driven in rotation by a motor 88 acting through a gear box 90 of suitable design. It should now be apparent that gin trash which gravitates to the bottom of the separators 68 and 70 is advanced through the conveyor 80 and fed to the conduit 24 through the valve 82.

Preferably, the impeller 22 is fed by the conveyer 80, however, should the need arise, the mode of operation for the valve 34 is switched so that the impeller is fed directly from the source 12 as the trash is caused to by-pass cyclone separators 68 and 70 through the by-pass conduit 32.

The impeller 22, preferably driven by an electrically energizable motor, not shown, serves to force gin trash delivered thereto upwardly through the conduit 28 to the two-way valve 36, aforementioned.

The valve 36 is similar in design and construction to the valve 34 and includes, where desired, a pivotal plate 92. This plate is connected with a motor 94 through a linkage 96, whereby the valve selectively connects the conduit 28 with conduits 30 and 35. Thus the direction of flow of gin trash is controlled.

For example, during periods of normal operation, or those periods in which gin trash is fed directly from the impeller 22 to the shredder subsystem 20, the valve 36 is operated in a mode in which the conduit 28 is connected in communication with the conduit 30. However, in the event feeding of gin trash to the shredder must be terminated, for any one of various reasons, the mode of the valve 36 is switched for interrupting the flow of gin trash through the conduit 30, while communication between the conduits 35 and 28 is established simultaneously for returning gin trash to the waste recovery system 18.

Shredder Subsystem

Figure 3:
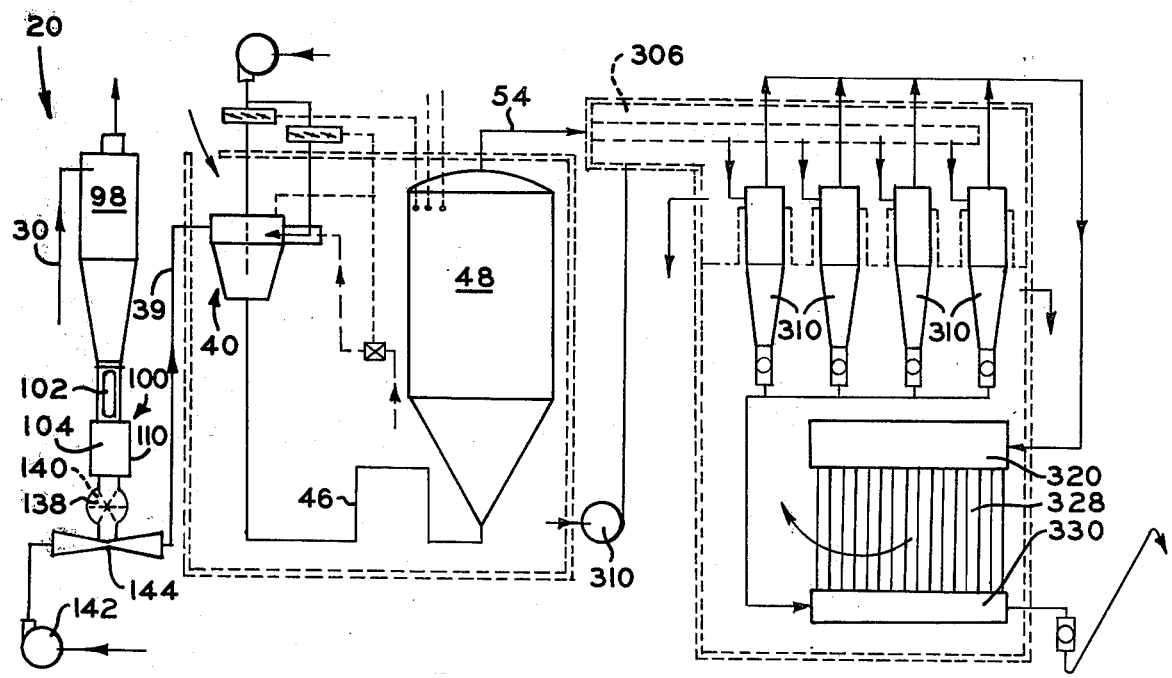
FIG. 3 is a diagrammatic view of a shredder, igniter, main burner and filter subsystem.
Figure 4:
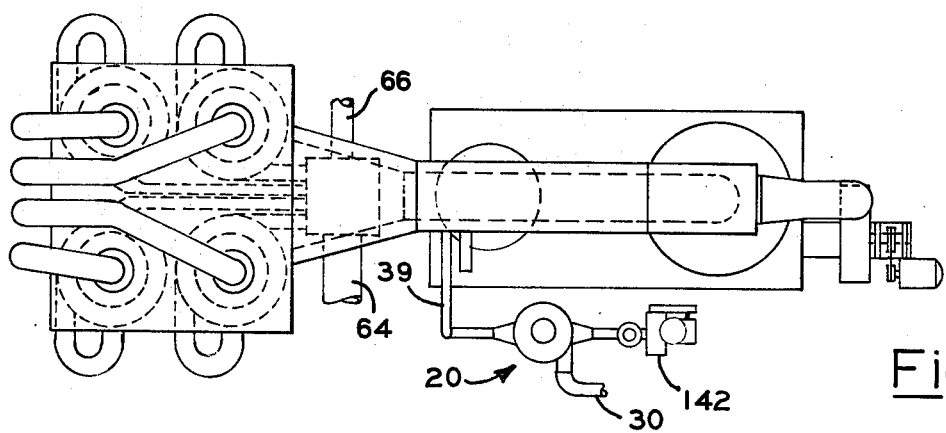
FIG. 4 is a top-plan view of the shredder, igniter, main burner and filter subsystem diagrammatically illustrated in FIG. 3.
Figure 5:
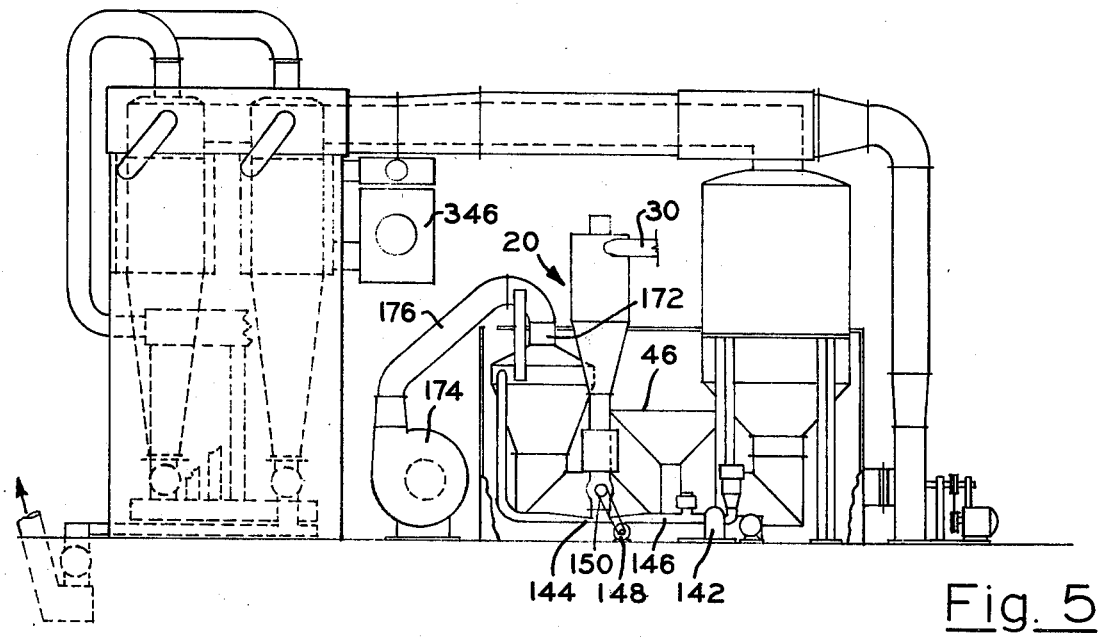
FIG. 5 is a side elevational view of the subsystem shown in FIG. 4.

Turning now to the shredder subsystem 20, as best illustrated in FIGS. 3 and 5, the shredder subsystem includes a cyclone separator 98 having a chamber, not designated, defined therein and a shredder, generally designated 100, connected in communication with the separator 98 at its lower end.

The cyclone separator 98 is similar to the separators 68 and 70 and includes an intake orifice having a tangentially directed axis communicating with the conduit 30. Thus gin trash is conveyed in a stream of air from the impeller 22 and delivered tangentially into the cyclone separator. The trash thus delivered is permitted to gravitate downwardly through a feeder conduit 102 to be introduced into a shredder 104.

The shredder 104, as shown in FIGS. 7 and 8, includes a first shredding roller 106, supported by a shaft 107, and a second shredding roller 108, supported by a shaft 109. The shafts 107 and 109 are supported for counter-rotation by suitable bearing structure, not designated. The rollers of the shredder are encased in a suitable housing 110 formed in any suitable manner utilizing sheet metal or the like.

Each of the shredding rollers 106 and 108 includes a plurality of circular saw blades affixed to the shafts 107 and 109 and supported for rotation thereby. As particularly illustrated in FIG. 9, the saw blades 112 are arranged in mutually spaced planes which are inclined with respect to the axes of the shafts so that each saw blade, in effect, cuts an imaginary kerf overlapping with respect to the imaginary kerf cut by the two adjacent saw blades. Thus collection of gin trash along the periphery of the rollers is precluded as the shredding rollers 106 and 108 function in a manner not totally unlike the so-called "wobble rollers".

Additionally, each of the circular saw blades 112 includes about its periphery a plurality of teeth 114, each being of an acuminate configuration. The teeth are separated by rounded or arcuate gullets 116 in order to assure that gin trash is discharged from between the teeth by the inertia developed as rotary motion is imparted to the shredding rollers. It should, therefore, be understood that trash collecting voids simply do not exist in the bite defined between the shredding rollers 106 and 108.

Furthermore, while only a pair of shredding rollers 106 and 108 is illustrated, it is to be understood that where desired the rollers may be increased in number for enhancing shredding operations. For example, the rollers may be ganged in threes rather than pairs.

In order to impart counter-rotation to the shredding rollers 106 and 108, there is mounted on an extended end portion of the shaft 107 a sprocket 118 about which is trained an endless chain 120. The chain 120 also is trained about a sprocket 122 driven through a suitable drive train, not designated. A spring loaded, slack removing idler assembly 124 is provided for accommodating changes in the effective length of the chain 120 as the relative position of the roller 106 is changed.

As shown, a vee-belt sheave 126 is mounted at one end of the shaft 109 and receives a vee-belt 128. This belt is also trained about the sheave 130, also driven through a suitable drive train, not designated. Thus the shredding rollers 106 and 108 are connected to be driven in counter-rotation by drive trains, preferably of a type including electrically energized motors, not designated.

The shredding rollers 106 and 108 are located immediately beneath the conduit 102 and communicate therewith through a throat 132. Through the throat 132 gin trash is introduced between the bite of the rollers 106 and 108. Of course, as may be expected, the gin trash often comprises large, bulky, compacted and non-uniform masses of trash as it enters the bite between the rollers 106 and 108. In order to accommodate entry of such masses of trash, the roller 106 is supported for displacement relative to the throat 132 in any suitable manner. As shown, the roller 108 is supported by pivotal arms 134 concentrically related to the roller 108 so that pivotal motion imparted to the arm 134 serves to displace the roller 106 about the periphery of the roller 108. A spring 136 is provided for urging the roller 106 toward the roller 108. Of course, other roller supporting devices can be employed equally as well.

It is to be understood that as gin trash passes into the bite defined between the rollers 106 and 108, the saw teeth 114 tear and thus particlize the trash. That is to say the teeth 114 tear the trash into small particles of generally uniform dimensions, herein referred to as particlized.

The particlized trash is discharged from the rollers downwardly into an air lock 138. Within the air lock 138 there is mounted a rotating gate 140, FIG. 3, the purpose of which is to isolate the shredder subsystem 20 from the conduit 39, since the conduit 39, as employed, is pressurized through a use of a motor driven compressor 142. The compressor 142 is connected to the inlet end of a venturi 144, through a conduit 146 connected to the discharge of the air lock 138, to establish a negative pressure at the lowermost or discharge end of the air lock. Thus, the compressor 142 charges the conduit 39 through the venturi 144 whereby a stream of air is accelerated as it enters the conduit 39.

The midportion or low pressure region of the venturi 144 is connected in communication with the air lock 138 through a suitable throat or passageway, not designated, whereby particlized gin trash is drawn from the air lock and introduced into the stream of air passing through the venturi, and introduced into the conduit 39. Of course, once the gin trash has been introduced into the conduit, it is transported by the stream of air and discharged tangentially into the igniter 40.

Igniter

Figure 11:
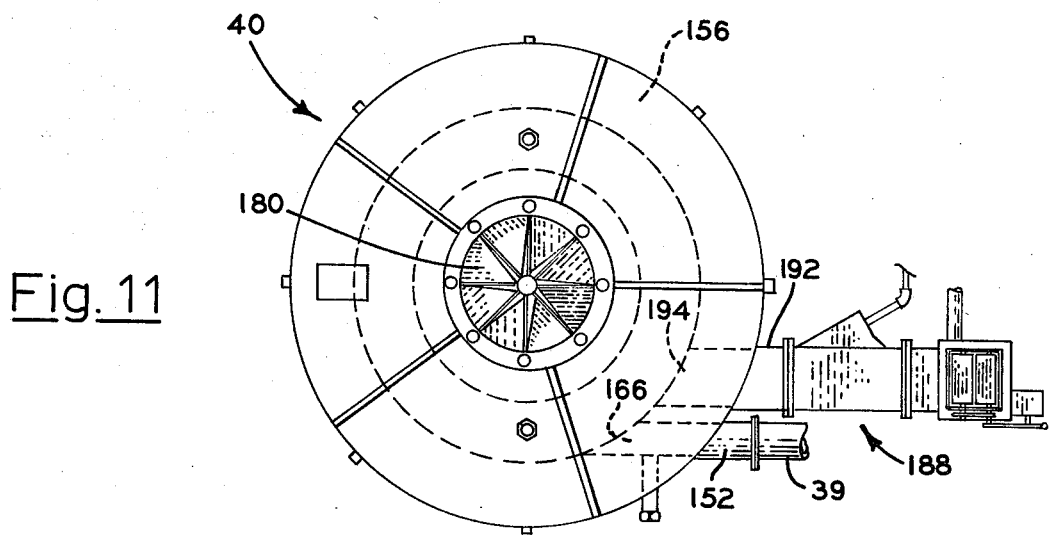
FIG. 11 is a top-plan view of an igniter subsystem included in the system of FIG. 1.
Figure 12:
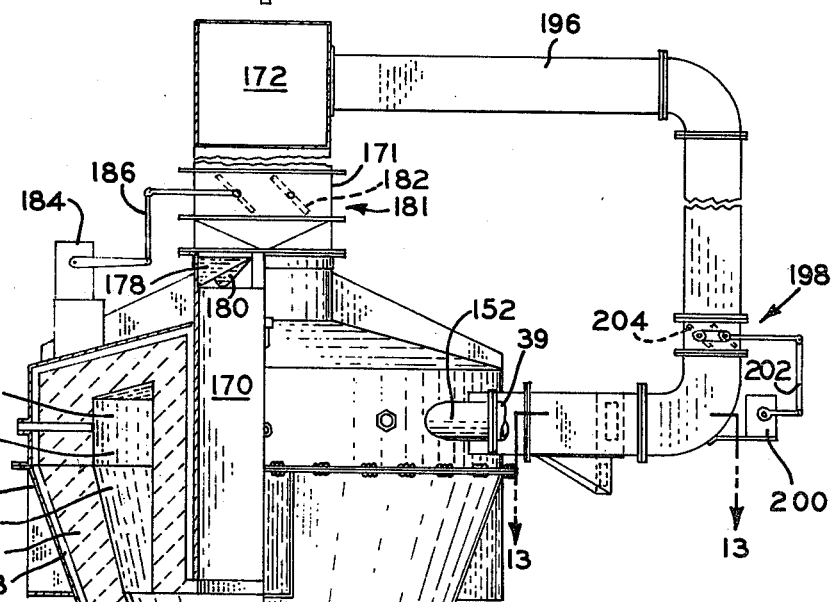
FIG. 12 is a partially sectioned side elevation of the igniter shown in FIG. 11.

Turning now to FIGS. 11 and 12, wherein the igniter 40 is most clearly illustrated, it can be seen that the conduit 39 terminates in a discharge segment 152 connected in direct communication with the interior of an ignition chamber 154 of the igniter 40.

As a practical matter, the igniter 40 is provided with a metallic shell 155 within which there is disposed a liner 156 formed of a refractory material such as that commercially available under the trademark Mizzou. Externally, a layer of insulation 158 is applied to the shell 155.

The liner 156 is of a generally annular cross-sectional configuration, as shown in FIG. 11, and conforms generally to the shape of the shell 155. Consequently, the liner assumes a substantially inverted frusto conical configuration, the purposes of which will hereinafter become more readily apparent.

As a practical matter, the liner 156 is of a rigid but articulated configuration having a base segment 160, a midsegment 162 and a distal segment 164. The base segment 160 is of a substantially cylindrical configuration and includes an opening 166 the axis of which parallels a tangent to the segment. The opening 166, in turn, is coaxially aligned with the discharge segment 152 of the conduit 39 so that particlized gin trash is propelled tangentially into the chamber of the igniter, by the stream of air delivered through the conduit 39. Thus the particles of trash are caused to progress about an annular path in contiguous engagement with the surface of the liner for purposes of auto ignition. Also, it is important to note that the midsegment 162 of the liner 156 is of a substantially inverted, truncated conical configuration, as is the distal segment 164. Thus the path of the particles defines a spiral, and a vortexing of the stream of air introduced into the chamber 154 is experienced prior to exiting the igniter, whereby the particles are caused to scour the surface of the liner.

In operation, the liner 156 is heated to elevated temperatures sufficient to cause the particles to ignite as they are caused to scour the surface of the liner, in the presence of atmospheric air of the stream within which the particles are suspended. Of course, as the kinetic energy of the particles is dissipated, the particles of trash gravitate downwardly toward the discharge orifice 168 provided in the bottom of the ignition chamber 154. Through this orifice the particles exit the ignition chamber in an ignited condition.

In order to accelerate the ignited particles as they are discharged from the ignition chamber 154, the igniter 40 also is provided with a vertically oriented duct 170 extended downwardly into the chamber in concentric relation therewith. This duct terminates in spaced coaxial relation with the orifice 168 and is connected through an intermediate duct segment 171 with an air supply duct 172.

The air supply duct 172, in turn, communicates with a blower 174, FIG. 5, through a suitable conduit 176. Between the duct 171 and the duct 170, there is provided a baffle 178 having a plurality of angulated vanes 180. The vanes 180 serve to impart angular velocity to a stream of air as it is passed therethrough whereby the stream progresses with a vortexing motion. Thus the stream of air, as it is introduced into the duct 170 from the duct 172, is caused to progress along a vortexing path so that the stream possesses angular momentum as it exits the duct 170. Hence, air introduced into the conduit 176, by the blower 174, exits the vertical duct 170 in a vortexing stream and unites with the vortexing stream of the ignited particlized trash passing downwardly through the chamber 154. Of course, combustion of the ignited particles is supported by the air thus caused to exit the orifice 168.

A damper assembly 181 is provided to control the rate at which air is introduced into the chamber 154 of the igniter, via the vertical duct 170, and thence into the distal segment 164 thereof. The damper assembly 181 is provided with a plurality of pivotal damper plates 182 supported within the duct segment 171, between the ducts 170 and 172. The damper plates 182 are of a known design and the operation thereof is controlled by a servo motor 184 through a suitable linkage 186. Since the servo motor 184 and linkage 186 are of a suitable design, a detailed discussion thereof is omitted in the interest of brevity. However, it should be understood that the servo motor 184, upon being energized, displaces the damper plates in pivotal displacement through motion thus imparted to the linkage 186. Displacement of the plates increases or decreases selectively with the flow rate for the stream of air introduced from the duct 172 into the duct 170.

Figure 13:
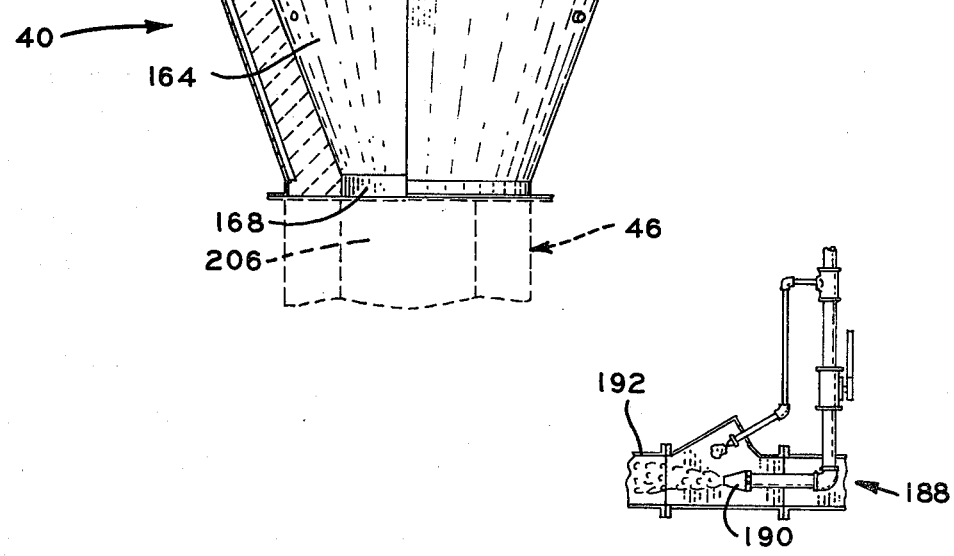
FIG. 13 is a fragmented, partially sectioned view illustrating a gas burner employed in initiating operation of the igniter shown in FIGS. 11 and 12.

Digressing for the moment, it will, of course, be understood that once ignition of particlized trash occurs within the chamber 154 of the igniter 40, heat is transferred to the liner 156 so that the liner ultimately attains required temperatures sufficient for causing particles of trash in contact therewith to ignite or undergo auto ignition. However, for "start-up", as well as to provide supplemental heat where required, there is provided a pressurized burner 188, FIG. 13. The burner 188 includes a gas jet 190 extended axially with respect to a blower duct 192 communicating with the chamber 154 through an opening 194. The purpose of the jet is to project a plume of burning gas into the chamber 154. In order to assure that a plume of burning gases is projected into the chamber 154 via the blower duct 192, a pressurized stream of air is supplied by the duct 196 connected with the supply duct 172. The duct 196 terminates in coaxial alignment with the blower duct 192 and the gas jet 190.

It should, therefore, be apparent that a stream of pressurized air is delivered from the supply duct 172, via the air supply duct 196, to the pressurized burner 188 so that a plume of burning gases extends axially through the blower duct 192 into the chamber 154 for igniting trash confined therein and for heating the liner 156.

As a matter of interest, the axes of the discharge segment 152, of the conduit 39 and the opening 194, for the blower duct 192, are extended in parallelism with the opening 194 being considered to be positioned downstream of the opening 166 for the discharge segment 152. Hence, as particles of trash are caused to impinge upon the curved surface of the ignition chamber 154, within the base segment 160, heat is extracted from the chamber. Should the particles not yet ignite because of inadequate temperature of the linear, the particles are caused to ignite as they pass in the vicinity of a plume of heated gases projected axially through the blower duct 192, by the gas jet 190. Such may be expected to occur during start-up operations.

As shown in FIG. 12, a suitable damper 198 is interposed within the air supply duct 196 for purposes of controlling the flow rate for air forced therethrough. A suitable servo motor 200 acting through linkage 202 connected to pivotal plates 204 serves quite satisfactorily for this purpose. Since the damper 198 is similar in design and construction to the damper 181, a more detailed discussion thereof is omitted in the interest of brevity.

It should now be apparent that as particles of trash, such as particlized gin trash, are blown into the ignition chamber 154 of the igniter 40, they are caused to ignite as they impinge against the surface of the liner 156. As they move along the surface, due to the momentum imparted thereto by the stream of air, they are caused to scour the surface of the liner so that combustion occurs. This combustion is supported by the stream of combustion supporting air expelled in a vortexing fashion downwardly through the vertical duct 170. The vortexing stream of air exits the duct 170 and combines with the stream of air for supporting the ignited particles in suspension as the streams exit through the discharge orifice 168 of the igniter and pass into an entry orifice 206 of the agitator 46.

Agitator

The agitator 46 includes a first linear segment 208, FIG. 17. This segment is vertically oriented and communicates with a horizontally oriented second segment 210, a third segment 212, a fourth segment 214, a fifth segment 216, a sixth segment 218 and a seventh or final segment 220. Each of the segments 208 through 220 of the agitator 46 is of a substantially linear configuration and the longitudinal axis of symmetry thereof is normally related to the axes of adjacent segments. Consequently, a stream of burning particlized trash and air forced through the agitator is subjected to turbulence created in the segments thereof. Due to the turbulence thus created within the agitator 46, a mixing of the air with the burning particlized trash is assured. Due to this mixing of air and trash, continued burning of the particles is assured as the particles are transported by the stream of air.

In order to prevent creation of "clinkers" within the agitator 46, the flow rate for the stream of air directed through the vertical conduit 170 is at a level such that the particles continue to be swept through the agitator is suspended relationship with the stream. Thus, adequate quantities of oxygen are made available to assure complete combustion of the particles of trash, as the burning particles and residue are literally swept through the agitator. Moreover, while, as shown, the segments are normally related, it should be appreciated that the internal surfaces, near the planes of intersection of the segments, are arcuately configured so as to reduce the likelihood that "pockets" will be developed in the stream for entrapping burning particles of trash.

Each of the segments of the agitator 46 is provided with a refractory lining 222, also formed of a castable refractory material such as the aforementioned Mizzou. Hence, the agitator is protected against burn-out.

In view of the foregoing, it can be appreciated that trash particlized by the shredder subsystem 20 and ignited by the igniter 40 continues to burn as it is passed through the turbulence of the agitator 46 and introduced into the main burner 48. Within the main burner, combustion is completed.

Main Burner

The main burner 48, as a practical matter, includes a cylindrical body 224 having a floor plate 226 of an inverted, substantially truncated conical configuration, while a cover plate 228 is provided for closing the upper end portion of the cylindrical body 224.

As can be seen in FIG. 16, the main burner 48 also includes a refractory liner 300 of a material similar to that from which the liner 156 of the igniter 40 is fabricated. The floor plate 226 includes a central orifice 302 connected in communication with the uppermost end of the last in line segment, designed 220, of the agitator 46. Consequently, the orifice 302 serves as a delivery orifice through which ignited particles of waste are forced vertically into the burner with a velocity imparted thereto by the stream of air within which the particles are suspended.

It is important to note that the vertical dimension of the main burner 48 is such that ignited particles cannot be lifted by the stream of air employed in introducing the ignited particles into the main burner, until the mass thereof is dissipated. The vertical dimensions are such that ignited particles cannot be borne upwardly to the top of the chamber 225 until the particles have been consumed. Hence, substantially only by-products of combustion are permitted to escape from the main burner.

In order to accommodate escape of by-products of combustion, resulting from the burning of the particlized waste within the chamber 225, there is provided an exit orifice 304. Through this orifice, heated gases of combustion and ash are permitted to escape upwardly. It should, in view of the foregoing, be apparent that as heated air having ignited particles suspended therein is introduced into the chamber 225, through the orifice 302, a turbulent action is experienced. The stream, upon entering the orifice 302, attempts to lift the ignited particles upwardly along the vertical axis of the chamber while the particles gravitate downwardly as they move radially toward the walls of the chamber. Consequently, a thorough mixing of the burning particles continues until such time as the particles become substantially totally consumed and their mass thus reduced. Heated gases and ash, or the end products or by-products of combustion, are, of course, propelled upwardly through the orifice 304 to be received within the conduit 54 and subsequently conveyed to the heat exchanger 52 and thence to the filter subsystem 56.

Heat Exchanger

As a practical matter, the conduit 54 is concentrically related to a tubular conduit 306, FIG. 19, which forms a jacket for the conduit 54 and has defined therein a cylindrical passageway 308 of substantially annular, cross-sectioned configuration. This passageway is concentrically related to a portion of the conduit 54 and serves as a heat exchanger. Through the passageway 308 there is established a flow of air to be heated as it is forced to flow along the external surface of the conduit 54. As aforementioned, a fan 58 serves to introduce ambient atmospheric air into the heat exchanger 52 through the conduit 60. Thus the ambient atmospheric air extracts heat from the external surface of the conduit 54 ultimately to be returned to the gin for drying purposes, subsequent to passage through the filter subsystem 56, as will become apparent.

Filter

As best illustrated in FIGS. 19 and 20, the by-products of combustion escaping from the main burner 48 pass through the heat exchanger 52 to be introduced tangentially into a plurality of cyclone separators 310. Each of the separators is provided with a first chamber portion 312 of a substantially cylindrical configuration and a lower portion 314 of a substantially inverted truncated conical configuration. Since cyclone separators are well known, a detailed description of the cyclone separators 310 is omitted in the interest of brevity. However, it is to be understood that each cyclone separator is provided with an escape conduit 316 through which heated by-products of combustion are permitted to escape. The by-products of combustion are conveyed from the escape conduits 316 downwardly to a filter unit 56 which serves to extract ash from heated gases through a use of a plurality of fibrous filter bags 318.

Figure 21:
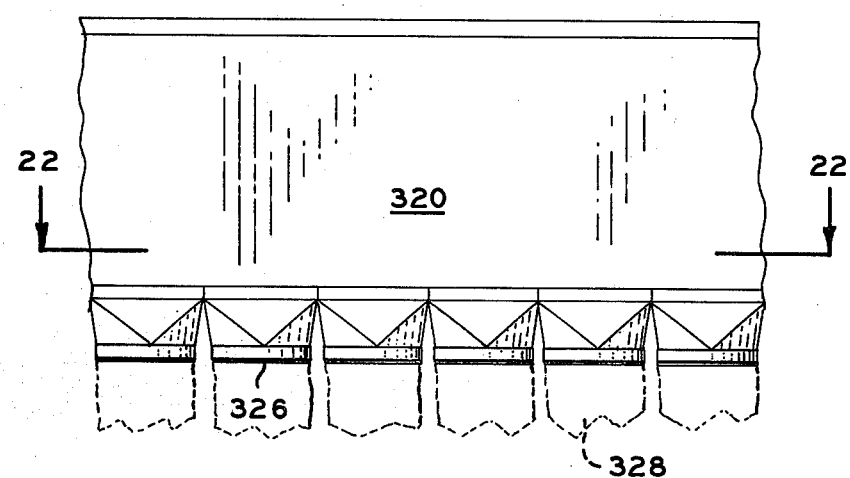
FIG. 21 is a fragmented end view of the filter subsystem.
Figure 22:
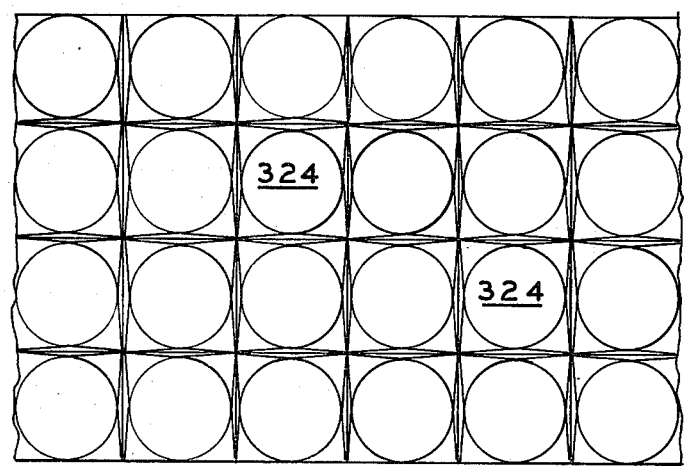
FIG. 22 is a fragmented side elevational view of the filter system shown in FIGS. 19 through 21.

As best shown in FIGS. 21 and 22, the filter unit includes a header chamber 320 connected in communication with the escape conduit 316 through an intermediate conduit 322. Within the bottom portion of the header chamber 320 there is provided a plurality of discharge orifices 324, FIG. 23, each having an annulus 326 to receive a mouth portion 328 of a fibrous filter bag 318. The filter bags 318 permit ash to gravitate downwardly therethrough while heated gases of combustion escape through the interstices of the wall thereof. The ash ultimately is received within a collection chamber 330 for removal from the system through a use of suitable conveyors, not designated.

Turning back for a moment to FIGS. 19 and 20, it should be apparent that air introduced into the passage 308 is discharged into orifices 332 of ducts 334 having discharge orifices 336. Each of the orifices 336, in turn, extends radially through an annular wall 338 which serves to define an anular heat exchanger chamber 340 of the heat exchanger 62. Each of these chambers is formed about the upper portion of one of the cyclone separators 310. Thus, air in its heated condition is introduced from the passageway 308 into a plurality of chambers 340, formed about the upper portions of the cyclone separators 310.

In order to remove the heated air from the chambers 340, there is provided a plurality of ducts 342 through which the chambers 340 communicate. The ducts 342 are provided with orifices through which the ducts communicate with a header 346. The header includes a header chamber 348 which serves as a collector for air heated in the heat exchangers 52 and 62 and from which the heated air is drawn to be delivered back to the gin through the conduit 64. The heated air thus is made available for various purposes including that of drying cotton seed and similar material within the gin.

It is important to note that about the cyclone separators 310 there is provided a chamber wall 350 the purpose of which is to substantially confine the gaseous by-products of combustion expelled through the walls of the filter bags 318. Thus the external surfaces of the walls 338 defining the walls of the heat exchanger chamber 340 also are subjected to the heat of the gaseous by-products of combustion. However, since it often is not found desirable to return the gaseous by-products of combustion to the gin, an extraction conduit 352 is connected in communication with the interior of the enclosure 350 and communicates with a header 354. This header is connected with the conduit 66 so that the heated gases are returned to atmosphere at a suitable location simultaneously with the deliverance of heated air through the conduit 64 back to the gin or similar structure.

Hence, it will be appreciated that the by-products of combustion including ash and heat are collected through subsequent usage within the filter subsystem 56.

OPERATION

It is believed that in view of the foregoing description of the system which embodies the principles of the instant invention, the operation of the system is fully understood. However, the following summary of the operation of the system is provided for the sake of completeness.

Turning back to FIG. 1, it is noted that a source of waste, such as gin trash or the like, is delivered via a conduit 16 to a waste recovery subsystem 18. The waste recovery subsystem 18 serves to provide a standing flow of waste to a shredder subsystem 20, via an impeller 22. The waste subsystem 18 includes a pair of cyclone separators 68 and 70 which serve to feed the impeller 22. As a practical matter, the cyclones 68 and 70 may be by-passed via the conduit 32, while a second by-pass including conduit 35 is provided for returning gin trash to the cyclone separator in the event the shutdown of the shredder subassembly 20 is contemplated.

In order to effect a by-pass of the cyclone separators 68 and 70, a two-way valve 34 is provided while a two-way valve 36 is provided for effecting a by-pass of the shredder from the impeller 22.

While control circuits have not been shown, it is to be understood that control circuits are provided for controlling the operation of the valves 34 and 36, as well as for controlling the screw conveyor 80.

Gin trash entering the shredder subsystem 20 usually is matted into relatively large, unmanageable masses, usually so compacted as to preclude ignition and burning. This is particularly true where the waste is of a type referred to as gin trash. Therefore, the cyclone separator 98 receives from the conduit 30 the gin trash, or waste of a similar nature, to be shredded by the saw blades 112 of the shredding rollers 106 and 108.

The waste is fed through the bite defined by the rollers 106 and 108 so that the saw blades 112, acting as wobble rollers, particlize the waste into small manageable particles of substantially uniform size. The particles gravitate downwardly through an air lock 138 including a rotating gate 140. The rotating gate 140 is driven at a suitable rate by a motor 148 for introducing particlized gin trash into the midportion of the venturi 144 through which a stream of air is forced by the fan of a compressor 142. Thus, the particlized gin trash is suspended in a stream of air and introduced into the conduit 39.

The particlized gin trash is then injected tangentially through the opening 166 into the ignition chamber 154 of the igniter 40. The surface of the liner 156 is heated to a temperature sufficient to cause the particlized gin trash to ignite, through auto ignition, as it scours along a circular path defined by the surface of the liner.

Incidentally, heating of the liner of the igniter is initiated through the operation of the pressurized burner 188 during start-up procedures.

The particlized gin trash is ignited and advances downwardly along a spiral path toward a discharge orifice 168 of the igniter. Simultaneously, a vortexing stream of atmospheric air is introduced through the vertical duct 170 and mixed with the stream of gases existing within the chamber and within which the particles are suspended as they advance downwardly along the wall of the liner 156. As the particles are advanced, they are discharged from the igniter 40 to the agitator 46.

The configuration of the agitator 46 is such as to create turbulence which assures a complete mixing of combustion supporting atmospheric air, introduced by the duct 170, and the particles. Thus the particles, as they become lighter as a consequence of burning, are transported through the agitator and introduced vertically into the main burner 48. Due to the mass of unburned particles found within the main burner, the unburned particles are agitated as the stream of air is forced vertically through the orifice 302 defined within the main burner. However, as particlized trash is consumed and the mass thereof is reduced, the by-products of combustion, including ash and heated gases, are discharged vertically through the orifice 304 into the conduit 54. From there the by-products of combustion are introduced into a heat exchanger 52 and thence into the filter subsystem 56.

As the heated by-products of combustion are conveyed by the conduit 54, a stream of air is introduced into the heat exchanger 52 and caused to flow in contiguous relation with the conduit 54 for extracting heat therefrom. The gases thus introduced into the heat exchanger 52 subsequently are introduced into the heat exchanger 62 surrounding the cyclone separators 310 for extracting further quantities of heat therefrom. Thus heated air is picked up by the header 346 and returned to the gin by the conduit 64.

The by-products of combustion are introduced into the cyclone separators 310 with a portion of the heated gases being expelled therefrom through the escape conduits 316 to be conveyed to a header 320 via conduit 322 and expelled through the fibrous walls of the filter bags 318, with the ash gravitating downwardly into the collection chamber 330 from which the ash ultimately is removed in a suitable manner. The gases expelled through the filter bags 318 are introduced into the enclosure 350 from whence they are drawn into the header 354 via conduit 352. From the header 354, the heated gases of combustion are expelled into atmosphere in any suitable manner.

In view of the foregoing, it should readily be apparent that the system which embodies the principles of the instant invention provides a practical solution in the perplexing problem of disposing of gin trash while simultaneously serving as an alternate source of energy.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a method for incinerating combustible gin waste, the steps of:
    A. particlizing gin waste to form particles of substantially uniform size;
    B. mixing said particles in a first flowing stream of atmospheric air;
    C. igniting said particles by causing said particles to frictionally engage a surface of an ignition chamber heated to a temperature sufficient to ignite the particles in response to the engagement thereof with the surface in the presence of the atmospheric air;
    D. suspending the ignited particles in a second stream of combustion-supporting air and downwardly expelling the second stream from the ignition chamber and thereafter conveying the ignited particles suspended in said second stream to a combustion chamber along a further path segment sufficiently turbulent to assure continued combustion of the ignited particles as they are conveyed from the ignition chamber to a combustion chamber; and
    E. entrapping the ignited particles in the combustion chamber until the particles are consumed.

2. A method of disposing of combustible waste comprising the steps of:
    A. mixing particles of waste with a first flowing stream of combustion-supporting air and introducing the stream into an ignition chamber;
    B. propelling the particles in the first stream of combustion-supporting air along a descending spiraled path segment in frictional engagement with a curved ignition surface heated to a temperature sufficient to initiate combustion of said particles for thereby igniting the particles;

C. suspending the ignited particles in a second stream of combustion-supporting air and downwardly expelling the second stream from the ignition chamber and thereafter conveying the expelled particles suspended in said second stream to a combustion chamber along a further path segment sufficiently tortuous for establishing within the second stream turbulence sufficient to assure continued combustion of the ignited particles as they are conveyed from the ignition chamber to a combustion chamber; and D. entrapping the ignited particles in the combustion chamber until the particles are consumed.

3. The method as defined in claim 2 wherein the step of entrapping ignited particles in said combustion chamber includes the steps of capturing a body of ignited particles and percolating upwardly therethrough said second stream of combustion-supporting air.

4. The method of claim 3 further comprising the step of transferring heat from said stream of heated gases to a stream of cooler gases.

5. The method of claim 3 wherein a further path segment includes angularly related linear segments and said particles are caused to advance therealong for assuring a continuous mixing of the particles in said stream.

6. The method of claim 4 further comprising the step of shredding waste to form particles of waste.

* * * * *

UNITED STATES PATENT AND TRADEMARK OFFICE
CERTIFICATE OF CORRECTION

PATENT NO. : 4,169,418
DATED : October 2, 1979
INVENTOR(S) : Cottrell et al.

It is certified that error appears in the above-identified patent and that said Letters Patent are hereby corrected as shown below:

Column 9, Line 39, delete "linear" and substitute ---liner---.

Column 10, Line 56, delete "designed" and substitute ---designated---.

Signed and Sealed this

Eighteenth Day of December 1979

[SEAL]

Attest:

SIDNEY A. DIAMOND

Attesting Officer

Commissioner of Patents and Trademarks